S. GRIFFIN.
COUPLING JOINT FOR PIPES AND OTHER CONNECTIONS.
APPLICATION FILED JULY 12, 1915.
1,178,714. Patented Apr. 11, 1916.
2 SHEETS—SHEET 1.
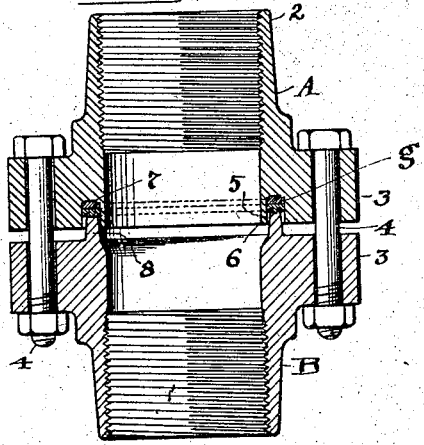
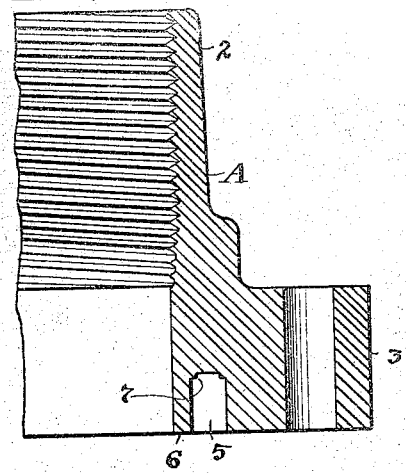
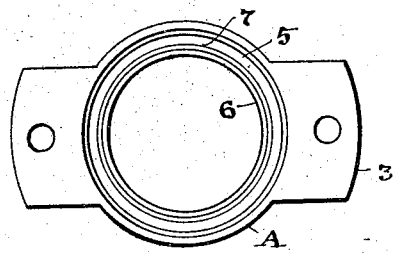
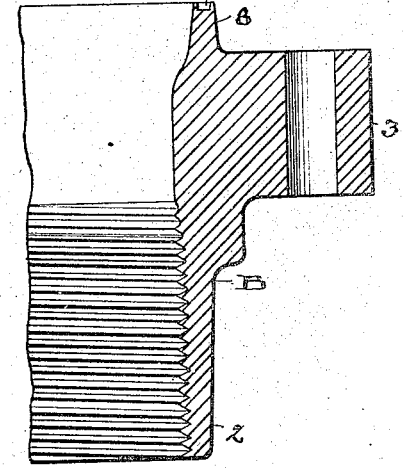
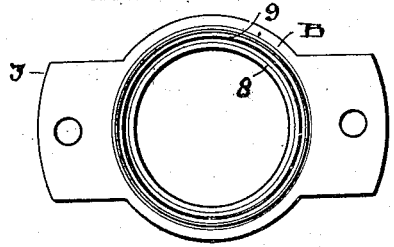
WITNESSES:
Geo. E. Kricker.
INVENTOR.
STANLEY GRIFFIN.
BY Fisher & Moser
ATTORNEYS.

S. GRIFFIN.
COUPLING JOINT FOR PIPES AND OTHER CONNECTIONS.
APPLICATION FILED JULY 12, 1915.
1,178,714.
Patented Apr. 11, 1916.
2 SHEETS—SHEET 2.
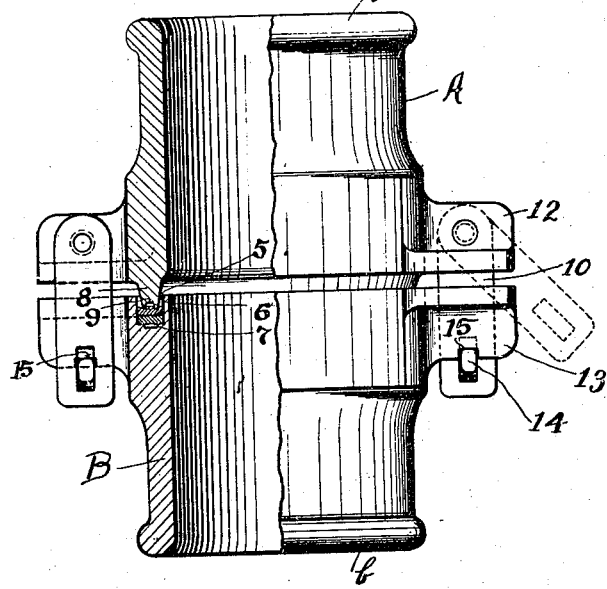
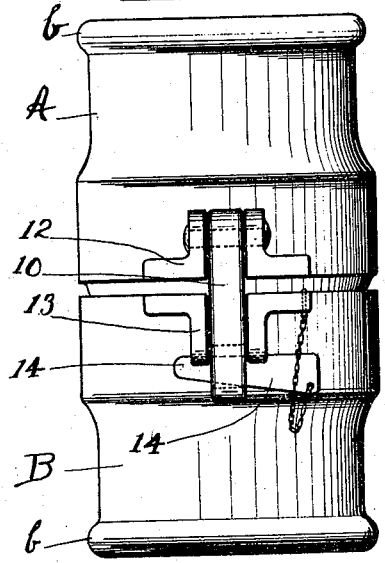
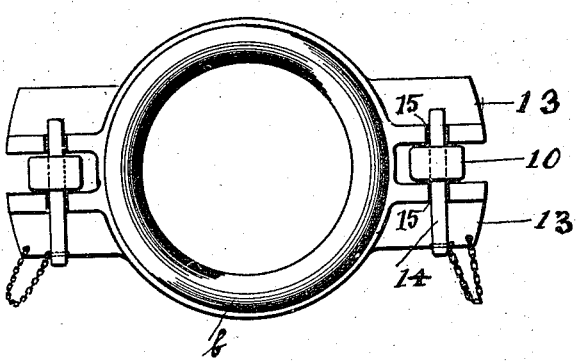
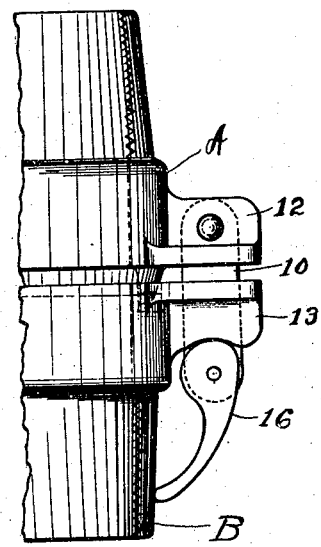
WITNESSES:
Geo. O. Kricker
INVENTOR.
STANLEY GRIFFIN.
BY Fisher & ____
ATTORNEYS.

UNITED STATES PATENT OFFICE.

STANLEY GRIFFIN, OF ELYRIA, OHIO.

COUPLING-JOINT FOR PIPES AND OTHER CONNECTIONS.

1,178,714.
Specification of Letters Patent. Patented Apr. 11, 1916.
Application filed July 12, 1915. Serial No. 39,388.

*To all whom it may concern:*

Be it known that I, STANLEY GRIFFIN, a citizen of the United States, residing at Elyria, in the county of Lorain and State of Ohio, have invented certain new and useful Improvements in Coupling-Joints for Pipes and other Connections, of which the following is a specification.

This invention relates to a coupling joint for hose and pipes, and the invention consists of two members adapted to be seated one upon or in the edge of the other in perfectly tight fluid relations and to be separably locked together, all substantially as shown and described and particularly pointed out in the claims.

In the accompanying drawings, Figure 1 is a central sectional elevation of the coupling in a form adapted to be used with pipes and assembled as in use. Fig. 2 is an enlarged elevation of a section of the upper coupling member as it appears in Fig. 1. Fig. 3 is a section of the two gaskets employed to make the joint effectively fluid tight. Fig. 4 is an enlarged elevation of a section or portion of the lower member of the joint as appears in Fig. 1. Fig. 5 is a face view of the upper member and Fig. 6 is a face view of the lower member, said views disclosing the tongue and groove of said members respectively. Figs. 7, 8 and 9 show the invention as modified for use in flexible hose, as fire hose, Fig. 7 being an elevation with a portion of the coupling broken out lengthwise; Fig. 8 is an elevation at right angles to Fig. 7 and Fig. 9 is a bottom view. Fig. 10 is an elevation of a section of the coupling with a further modification of the connecting mechanism and threaded for a pipe connection.

The invention as thus variously shown is designed to provide a coupling joint for hose, pipes and tubes which are subjected to what might be termed excessive pressure or such as comes from fire engines and hydraulic and other apparatus and machines of great power and in connection with which it has been exceedingly difficult to control leakage in any satisfactory or successful way. The present coupling is, therefore, presented to meet this need and, referring first to the construction in Figs. 1 to 6, I show the coupling as consisting of two members, sections or parts, A and B, which have externally smooth and slightly tapered necks or extremities 2 and internal screw threads adapted more especially to make rigid pipe connections. The said sections have ears or lugs 3 oppositely at their base through which bolts or screws 4 are engaged to lock said parts together. The member A has an annular groove or channel 5 in its face or inner edge spaced from the bore thereof by a comparatively thin wall 6 and narrowed at its bottom by shouldered offsets 7 at each side, thus abruptly contracting and narrowing said channel at its base and providing for the lateral compression of the gaskets *g* thereon.

The member B has an annular tongue 8 adapted to enter the said groove or channel 5 but relatively somewhat narrower than said channel in this instance, and said tongue is also preferably tapered, somewhat, toward its edge and has a channel or depression 9 in said edge which comes opposite the middle narrowed depression or channel in the base of groove 5 between the shoulders 7 and where it also comes into squeezing relations with the gaskets *g*. It follows when the said gaskets are placed in position and the coupling members are tightened on each other that the gaskets are not only compressed into the said comparatively narrow channels in both groove 5 and tongue 8, but the rather sharply defined walls of said channels form sealing portions which prevent the fluid from possibly creeping laterally past or through the gaskets. That is, with gaskets of the width shown and a comparatively narrow edge on the tongue 8 the gasket is compressed both within and without the channel 9 of the tongue and at the angles of the shoulders 7. Thus a perfectly fluid tight joint is effected regardless of the high pressures to which the joint may be subjected.

In Figs. 7, 8 and 9 I show a modification of the invention adapted especially for coupling flexible hose, say fire hose, when either an engine or a high pressure system is employed. In this construction the sections have each a suitably large head or rib *b* about their outer ends serving as a confining medium for wire or other suitable wrappings that may be employed to bind the hose on the coupling and the interior of the coupling is smooth throughout instead of being screw threaded, as in Fig. 1. The sealing features between the sections are identically the same as in Fig. 1, and the ears or lugs are dual on each section and spaced apart laterally to utilize the connecting links 10. The said links are pivoted between the lugs 12 of one set of said lugs and locked on the other set by means of a key or wedge 14. The said lugs 12 have transverse notches or slots 15 of sufficient depth to confine the said wedge and prevent the escape thereof in service, and both wedges can be driven as tight as may be required to make the joint secure and prevent possible leakage. The link 10 of course is slotted also to receive the said key or wedge.

In Fig. 10 I show a mixed modification which is like Fig. 1 in all particulars except as to the lugs 12 and 13 brought over from Figs. 7, 8 and 9 with a modification of lugs 13 to accommodate the cam 16, which is substituted for the wedge 15 and is constructed to bear on the concaved edges of both said lugs. The cam 16 might also be employed in the hose coupling in Figs. 7, 8 and 9. Either of the two forms provides for quick detachable and efficient connections.

What I claim is:

1. A coupling as described, having two parts and one of said parts having an annular channel with an angular shoulder at each side near the bottom thereof, and the other part having an annular tongue tapered at its sides and adapted at its edge to enter the bottom of said channel between said shoulders.

2. A coupling as described having a part provided with a tapered annular tongue provided with a walled groove in its edge, and a coupling member having an annular channel constructed to be entered by the said tongue and having a narrowed bottom portion centrally with shoulders along its sides and of a size in cross section between said shoulders corresponding substantially to the width of said tongue at its channeled edge.

In testimony whereof I affix my signature in presence of two witnesses.

STANLEY GRIFFIN.

Witnesses:
R. B. MOSER,
GEO. E. KRICKER.